United States Patent [19]
Miyoshi et al.

[11] Patent Number: 5,837,786
[45] Date of Patent: Nov. 17, 1998

[54] PROCESS FOR PRODUCING POLYESTER

[75] Inventors: Yasuo Miyoshi, Iwakuni; Yasuaki Urabe; Toshiharu Mitani, both of Kuga-gun, all of Japan

[73] Assignee: Mitsui Chemicals, Inc., Tokyo, Japan

[21] Appl. No.: 962,928

[22] Filed: Oct. 31, 1997

[30] Foreign Application Priority Data

Nov. 1, 1996 [JP] Japan ..................... 8-291769

[51] Int. Cl.⁶ .............................. C08F 2/00; C08G 85/00
[52] U.S. Cl. ........................... 526/68; 528/272; 528/274; 528/308.1; 528/308.6; 526/59; 526/60; 526/65; 526/66; 526/69; 526/71
[58] Field of Search .................................. 528/272, 274, 528/308.1, 308.6; 526/59, 60, 65, 66, 68–69, 71

[56] References Cited

U.S. PATENT DOCUMENTS

| 4,077,945 | 3/1978 | Heinze et al. |
| 5,339,255 | 8/1994 | Suzuki et al. |
| 5,383,776 | 1/1995 | Trail et al. ............................. 425/135 |
| 5,461,136 | 10/1995 | Krutak et al. ........................... 528/289 |
| 5,614,008 | 3/1997 | Escano et al. ........................... 523/161 |
| 5,665,151 | 9/1997 | Escano et al. ........................... 106/31.15 |
| 5,703,229 | 12/1997 | Krutak et al. ........................... 540/140 |

FOREIGN PATENT DOCUMENTS 0761713  3/1997  European Pat. Off.

OTHER PUBLICATIONS

Chemical Abstracts, vol. 99, No. 24, 12 Dec. 1983.
JP Kokai No. 2–306936A (English Abstract Only) (1990).
JP Kokai No. 2–206937A (English Abstract Only) (1990).

Primary Examiner—Samuel A. Acquah
Attorney, Agent, or Firm—Sherman and Shalloway

[57] ABSTRACT

A process for producing a polyester of uniform quality, in which a slurry of powdery aromatic dicarboxylic acid in a liquid diol is prepared and the resulting slurry is processed through an esterification step and a polycondensation step in the presence of a catalyst, is provided by performing the reactions in the esterification and the polycondensation in a stabilized condition, which process comprises recycling a liquid containing the unreacted diol and the catalyst separated from the reaction mixture in the polycondensation step back to the esterification step as recycling liquor, detecting the concentrations of diol, diol condensation product, catalyst and water in the recycling liquor in the course of being recycled back to the esterification step by a near infrared spectrophotometer of a noise level of at the highest $50 \times 10^{-6}$ Abs with a wave length repeatability of 0.01 nm or less as well as by an X-ray fluorescence analyzer and controlling the feed rate of each starting material based on the detected analytical values in such a manner that the totalized composition of the starting materials and the recycling liquor will be maintained in a predetermined range.

6 Claims, 1 Drawing Sheet

PROCESS FOR PRODUCING POLYESTER

FIELD OF THE INVENTION

The present invention relates to a process for producing a polyester by reacting an aromatic dicarboxylic acid with a diol and, in particular, to a process for producing a polyester in which the reaction conditions are controlled by analyzing the recycling liquid of unreacted diol.

DESCRIPTION OF THE RELATED TECHNIQUES

Polyesters, such as polyethylene terephthalate and so on, are produced by supplying an aromatic dicarboxylic acid, such as terephthalic acid and so on, and a diol, such as ethylene glycol and so on, to a reactor together with a catalyst and subjecting them to an esterification and, then, to a polycondensation. While it is important in such a technique to maintain a constant reaction condition for obtaining a polyester product of uniform quality, it has been difficult in practice to maintain the reaction condition and the product quality constantly with high accuracy, since a considerable time was required for the analysis of the contents of diol and catalyst during the production course.

It has been proposed a technique for controlling the reaction condition, such as temperature, pressure and reaction time, by the analytical data obtained by analyzing the acid value of the dicarboxylic acid and the hydroxyl value of the diol for the starting material side and the ester value of the resulting polyester and the reaction water for the product side using a near infrared spectrophotometer (Japanese Patent Kokai No. 2-306937 A).

However, analysis of diol concentration was still difficult even when such a technical measure was incorporated. While diol concentration in the polyester has a sound influence on the heat resistance of the formed articles made therefrom, such as bottles, it has been found that a quantitative analytical accuracy as the determination fluctuation in repeated analyses of below 3% as corresponding to that of a gas chromatography is required with simultaneous attainment of a specific wave length accuracy and noise level for obtaining a practically acceptable product quality. In addition, alteration of the reaction conditions, such as temperature, pressure and reaction duration, is difficultly attainable.

SUMMARY OF THE INVENTION

An object of the present invention is to provide a process for producing polyester, in which a stable control of supply of each starting material to the reactor is realized by performing analysis of materials at a high accuracy using a small sample amount within a short period of time without necessitating any pretreatment of the sample, whereby it is made possible to maintain a constant reaction condition and to produce a polyester with stable quality.

Thus, the present invention provides a process for producing a polyester by preparing a slurry of powdery aromatic dicarboxylic acid in a liquid diol and processing the resulting slurry through an esterification step and a polycondensation step in the presence of a catalyst, comprising recycling a liquid containing the unreacted diol and the catalyst separated from the reaction mixture in the polycondensation step back to the esterification step as recycling liquor, detecting the concentrations of diol, diol condensation product, catalyst and water in the recycling liquor in the course of being recycled back to the esterification step by a near infrared spectrophotometer of a noise level of at the highest $50 \times 10^{-6}$ Abs with a wave length repeatability of 0.01 nm or less as well as by an X-ray fluorescence analyzer and controlling the operation of the reactor based on the detected analytical values in such a manner that the totalized composition of the starting materials supplied to the reaction system and the recycling liquor returned thereto is maintained in a predetermined range.

DETAILED DESCRIPTION OF THE DISCLOSURE

Figure 1:
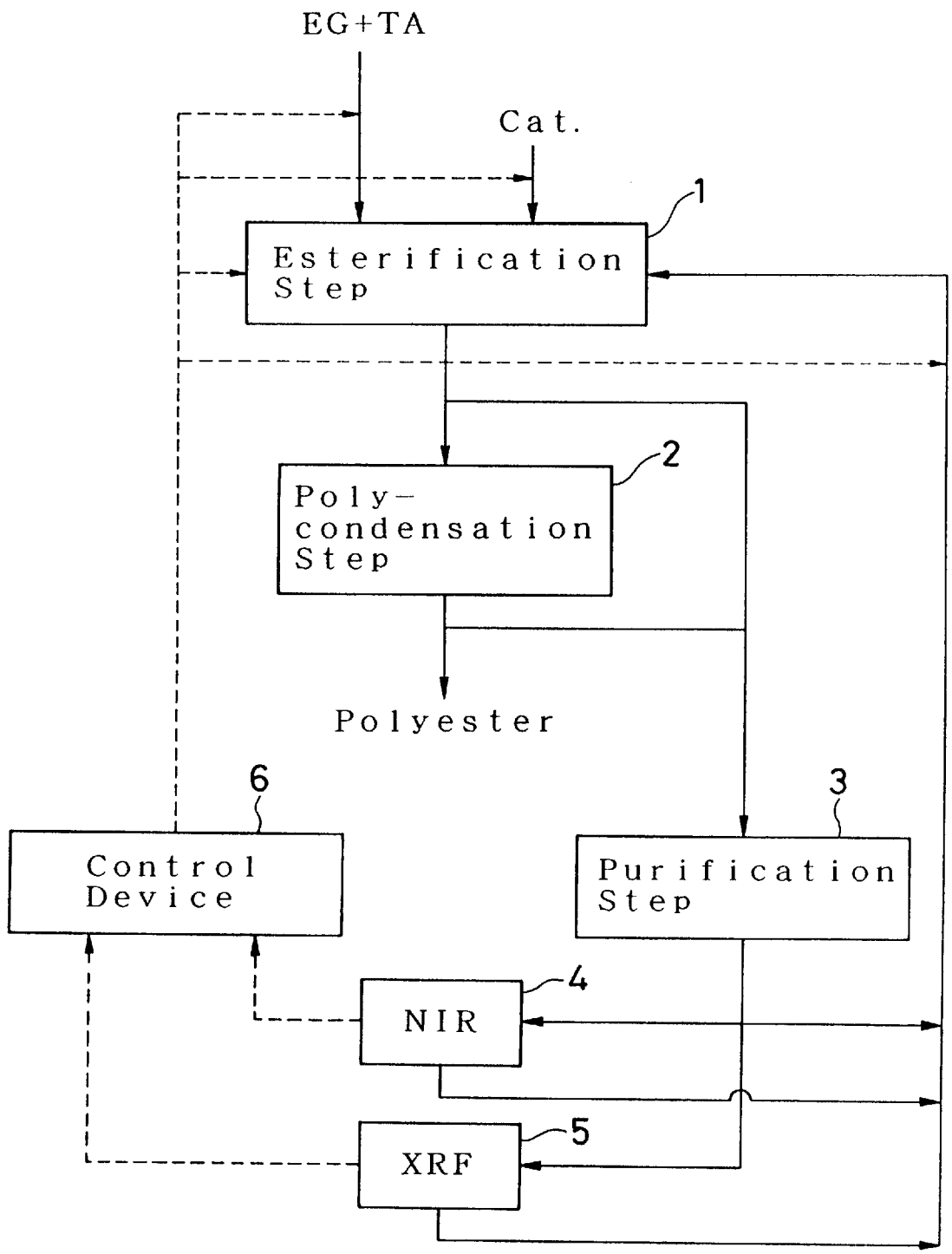
FIG. 1 shows a flow sheet of the process for producing polyester by the embodiment according to the present invention.

As the aromatic dicarboxylic acid to be used as a starting material according to the present invention, there may be exemplified terephthalic acid, isophthalic acid, naphthalene-dicarboxylic acid and so on. As the diol, there may be exemplified ethylene glycol, propylene glycol, butane diol and so on. They can be used as the starting materials either alone or in combination of two or more of them.

In the process according to the present invention, a slurry of powdery aromatic dicarboxylic acid in a liquid diol is first prepared and the so-prepared slurry is subjected to an esterification step and, then, to a polycondensation step for producing polyester. In preparing the slurry, the powdery aromatic dicarboxylic acid and, if necessary, a further powdery carboxylic acid are suspended in the liquid diol containing, if necessary, a further alcohol component under agitation at normal temperature and normal pressure. Here, the amount of diol may favorably be in the range of 1–2 moles, preferably 1.1–1.2 moles per one mole of the powdery aromatic dicarboxylic acid.

In the esterification step, the slurry obtained as above is heated favorably at a temperature of 220°–300° C., preferably 240°–270° C. under normal pressure or a superatmospheric pressure, preferably under a pressure in the range from normal pressure to 300,000 Pa, to cause the aromatic dicarboxylic acid to react with the diol to attain the esterification, while removing the reaction water formed by the esterification out of the system. By the esterification, ester of the aromatic dicarboxylic acid with the diol and polymers (oligomers) of such ester are formed. While the esterification can be carried out without using any catalyst, it is permissible to incorporate a polycondensation catalyst for the subsequent polycondensation step already on this stage.

It is preferable to carry out the esterification on a plurality of stages. Most of the diol separated from the reaction mixture of the esterification step is returned to the esterification step. The formed ester and the oligomers are forwarded together with the catalyst to the polycondensation step as a thick suspension in a relatively small amount of the liquid diol.

In the polycondensation step, the solid ester product and the oligomers formed in the esterification step are heated at a temperature of 240°–300° C., preferably 275°–290° C., under a pressure in the range from normal pressure to a reduced pressure, preferably under 14,000–60 Pa to subject them to a polycondensation, while removing the reaction water formed thereby, to obtain the contemplated product of polyester. While the polycondensation can be effected on one single stage, it may preferably be performed on a plurality of stages.

The polycondensation is effected in a liquid phase reaction in the presence of a polycondensation catalyst. As the polycondensation catalyst, for example, germanium compounds, such as germanium dioxide, germanium tetraethoxide and germanium tetra-n-butoxide; antimonial catalyst, such as antimony trioxide; and titanium catalyst, such as titanium tetrabutoxide, may be employed. It is preferable to select the catalyst compound so as to adapt to each specific quality of the product.

In the liquid phase in the above reaction mixture, a stabilizer can be incorporated together with the polycondensation catalyst. As the stabilizer, there may be used, for example, phosphate esters, such as trimethylphosphate, triethylphosphate, tri-n-butylphosphate, trioctylphosphate, triphenylphosphate and tricresylphosphate; phosphate esters, such as triphenyl phosphite, trisdodecyl phosphite and trisnonylphenyl phosphite; acidic phosphate esters, such as methyl acid phosphate, isopropyl acid phosphate, butyl acid phosphate, dibutyl phosphate, monobutyl phosphate and dioctyl phosphate; and phosphorus comounds, such as phophoric acid and polyphosphoric acid.

The amount of the catalyst used may usually be in the range of 0.0005–0.2 wt. %, preferably 0.001–0.05 wt. %, calculated as the metal in the catalyst, based on the total weight of the dicarboxylic acid and the glycol. The proportion of the stabilizer used may usually be in the range of 0.0001–0.1 wt. %, preferably 0.0002–0.02 wt. %, calculated as the phosphorus atom in the stabilizer, based on the total weight of the dicarboxylic acid and the glycol. When two or more catalysts based on, for example, germanium or germanium and antimony are used together, the calculation should be made on the basis of the total amount of metal in the total amount of the catalysts.

The polycondensation catalyst and the stabilizer may be supplied to the production system either in the esterification step or in the polycondensation step into each of the reactors. In the liquid phase polycondensation, the catalyst may be used in a state in which it is dissolved or suspended in the liquid phase of the reaction mixture.

The polyester included in the reaction mother liquor on the final stage of the liquid phase polycondensation step is separated from the reaction mother liquor and the resulting product of polyester is processed, if necessary, through a granulation step, a crystallization step and a solid phase polycondensation step to obtain the final product of the polyester. Through a diol recovery step, the diol is recovered together with the catalyst and the stabilizer from the reaction mother liquor and the so-recovered liquid is treated, if necessary, through a purification step, such as that described in Japanese Patent Kokai Hei 7-228677, before being recycled back to the esterification step as a recycling liquor.

According to the present invention, the recycling liquor is analyzed for the concentrations of diol, diol condensation product, water and catalyst using a near infrared spectrophotometer, whereupon the feed rates of the raw materials (including the aromatic dicarboxylic acid, diol, catalyst and so on) and/or the recycling rate of the recycling liquor are controlled based on the resulting analysis data so as to maintain the totalized composition of the materials supplied to the reaction system and the recycling liquor, such as the aromatic dicarboxylic acid, the diol, the diol condensation product, water and the catalyst in a predetermined range.

For effecting stabilized reactions in the steps of esterification and polycondensation so as to produce a high quality polyester product, it is important to maintain a certain definite composition of the starting materials supplied to the reaction system. In order to attain this, it is necessary to maintain the totalized composition of the raw materials newly supplied to the reaction system and the recycling liquor recycled to the reaction system within a predetermined range. For example, when the concentration of diol is increased, it is possible to control the total amount of each material introduced into the reaction system by the new feed and by the recycling at a predetermined value either by decreasing the feed rates of the starting materials or by decreasing the recycling rate of the recycling liquor. Here, it is also permissible to adjust the reaction conditions and so on. It is also preferable to carry out analysis and control of the concentrations of the stabilizer and metals in the recycling liquor in the same way.

A near infrared spectrophotometer serves generally for analyzing materials contained in a sample to be analyzed and for evaluating the material properties of the sample, by irradiating the sample with a near infrared ray of a wave length in the range of 500–3,000 nm, preferably 800–2,500 nm, more preferably 1,000–2,000 nm, and detecting the ray transmitted or reflected through or from the sample to obtain the absorption spectrum corresponding to the material, from which the analysis of the material and evaluation of the material properties can be attained. In the process according to the present invention, the recycling liquor is analyzed directly by a near infrared spectrophotometer on the way of recycling without subjecting the recycling liquor to any pretreatment and the results of the analysis are used for the control. The control may be effected using a control device, such as a computer, so as to maintain the totalized composition of the materials supplied to the reaction system and the recycling liquor in a predetermined range.

For the near infrared spectrophotometer, a high accuracy one which exhibits a noise level of at the highest $50 \times 10^{-6}$ Abs, preferably at the highest $20 \times 10^{-6}$ Abs, and a repeatability of wave length of 0.01 nm or less is necessary. Methods for determining the noise level and the repeatability of wave length are as given below.

Method for Determining Noise Level

For determination by reflection, twice determinations by reflection from a ceramic plate and, for determination by transmission, twice determinations by transmission through atmospheric air are performed and the light absorbance difference between them for 20 sets of such a pair of determinations selected each at an interval of 2 nm are observed. The difference in the standard deviation between the pair of the first and the second determinations (in the root mean square values) is taken as the noise level.

Method for Determining Wave Length Repeatability

In accordance with the General Rule for Infrared Spectrophotometry of JIS K 0117-1979, a piece of the standard polystyrene film is inserted in the light path and determinations are repeated. As the standard wave lengths of near infrared rays, four, namely, 1143.6330 nm, 1684.2700 nm, 2166.4000 nm and 2305.9300 nm are employed. The standard deviation from 10 observations is used as the repeatability of wave length.

The near infrared spectrophotometry is used for analyzing the concentrations of the diol, the diol condensation product, water and others in the recycling liquor. Due to the low energy level of near infrared rays as compared with ultraviolet rays, the substances in the sample to be analyzed may not be subjected to any substantial alteration. Since it deals with an absorption spectrum as contrasted to the case of using a visible light, it is not affected by any physical property of the sample, such as transparency etc., so that adjustment of the sample thickness and so on can be dispensed with.

Therefore, the recycling liquor can be used for the analytical sample as such without necessitating any pretreatment thereof. Since the recycling liquor is not subjected to any chemical change by such an optical analysis, the analysis apparatus will not suffer from any pollution and can be used for the analysis for a succesive long term.

An X-ray fluorescence analyzer serves generally for analyzing a sample by irradiating a primary X-ray of a definite strength onto the sample and detecting the thereby generated fluorescent X-ray in the secondary X-ray to attain analysis of the sample. An X-ray fluorescence analyzer can afford to attain analysis of elements, especially of inorganic elements. Therefore, the process according to the present invention employs an X-ray fluorescence analyzer for analyzing the metal element, such as germanium, in the catalyst, the elements in the stabilizer, such as phosphorus, and metal elements in the recycling liquor, such as iron. Also X-ray fluorescence analyzer can attain the analysis without necessitating any pretreatment of the sample.

For the controlling unit, computers and the like may be employed, which may be used for the wave length calibration, spectrum wave form processing, digital computing operation and control of feed rates in the near infrared spectrophotometer and, in the X-ray fluorescence analyzer, for the calibration, detection of the secondary X-rays, formation and multiplication of signals, formation of spectrum, digital computing operation, control of feed rates and so on.

It is possible by the process according to the present invention to carry out the reactions in the esterification step and in the polycondensation step in a stabilized condition and to attain production of a uniform quality product of polyester by analyzing the fluctuating concentrations of the components in the recycling liquor and controlling the operation of the reactor based on the detected analytical values in such a manner that the totalized composition of the materials supplied to the reaction system and the recycling liquor will be maintained in a predetermined range.

THE BEST MODE FOR EMBODYING THE INVENTION

Below, the present invention is described by an embodiment for producing a polyethylene terephthalate (abbreviated hereinafter as PET) as the polyester from terephthalic acid (abbreviated hereinafter as TA) as the aromatic dicarboxylic acid and ethylene glycol (abbreviated hereinafter as EG) as the diol with reference to the appended Drawing. FIG. 1 shows a flow diagram for this embodiment.

For producing the PET, the raw materials, TA and EG, are supplied to the esterification step 1. The starting material for the aromatic dicarboxylic acid may be in any quality so long as it contains TA as the main component and, thus, it may contain 20 mole % or less of other dicarboxylic acids than TA, such as phthalic acid, isophthalic acid and naphthalene dicarboxylic acid.

In the esterification step 1, 1–2 moles, preferably 1.1–1.2 moles of EG are added thereto per one mole of TA and the mixture is agitated so as to disperse and suspend the TA crystals in the liquid EG to form a slurry. The starting liquid diol as used also for the dispersing medium may be in any quality so long as it contains EG as the main component and, thus, it may contain other diols than EG, such as trimethylene glycol and propylene glycol, in an amount not higher than 20 mole %.

To the resulting slurry, a catalyst composed of germanium compound, such as germanium oxide, and/or antimony compound, such as antimony acetate, is added in an amount of 5–1,000 wt. ppm, preferably 100–300 wt. ppm calculated as the metal, based on the weight of the slurry.

The resulting slurry is subjected to reaction in the esterification step 1 at a temperature of 220°–300° C., preferably 240°–260° C., under a pressure in the range from normal pressure to a superatmospheric pressure, preferably from normal pressure to 300,000 Pa to convert TA and EG into their ester while removing the reaction water formed during the esterification.

In the esterification step 1, BHT (bis-β-hydroxyetyl terephthalate) is produced through an esterification of TA with EG (a reaction of an acid with an alcohol while forming water) by the reaction series (1) to (4) given below:

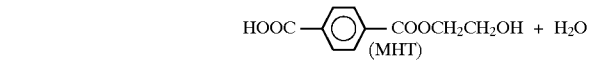

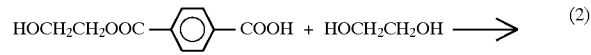

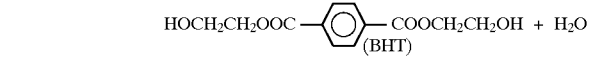

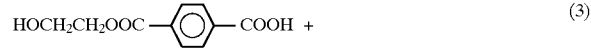

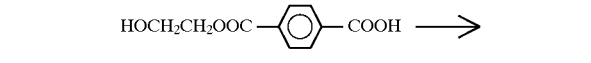

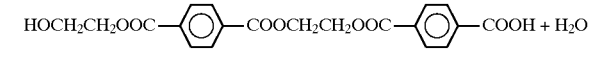

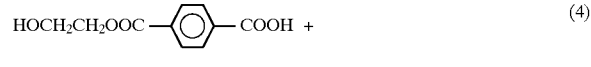

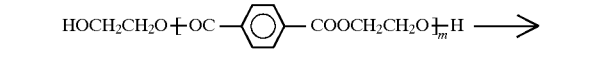

In the above reaction scheme, MHT represents mono-β-hydroxyethyl terephthalate.

In the esterification step 1, the reactions of above (1) to (4) take place, wherein the reaction mixture includes mixtures of compounds formed by coupling several BHTs together (represented as a whole by BHT). For the case where the mole ratio EG/TA=2, the reaction (2) takes place predominantly. In the practice, however, a lower mole ratio of EG/TA is employed and, therefore, the reactions (3) and (4) also take place. While it is said that the reaction product is composed usually of monomer to tetramer, polymers up to about 10-mer are present in fact. The esterification reaction generates nearly zero reaction heat.

The reaction liquor in the esterification step containing the ester (BHT) and EG as the dispersing medium is forwarded, after the most of EG has been removed, to the polycondensation step 2 where it is subjected to a polycondensation at a temperature of 240°–300° C., preferably 260°–290° C., under a pressure in the range from normal pressure to a reduced pressure, preferably from 14,000 Pa to 60 Pa, to produce PET.

In the polycondensation step 2, PET resin is produced by subjecting BHT to polycondensation at a high temperature under a high vacuum under removal of EG from BHT, wherein reactors in a plurality of stages are used for the polycondensation to attain an efficient production rate.

In the polycondensation step 2, side reactions including thermal decomposition, hydrolysis, formation of DEG (diethylene glycol) and formation of oligomers may take place in addition to the main reactions, namely, polycondensation and esterification. The polycondensation proceeds by elimination of EG from BHT to successively polymerize into higher polyester, in accordance with the reaction scheme (5) given below. In the esterification, the carboxylic acids of those remained unreacted in the esterification step and those formed upon a thermal decomposition are brought into reaction with ethylene glycol to form corresponding esters while forming water, as shown in the reaction scheme (6) geven below.

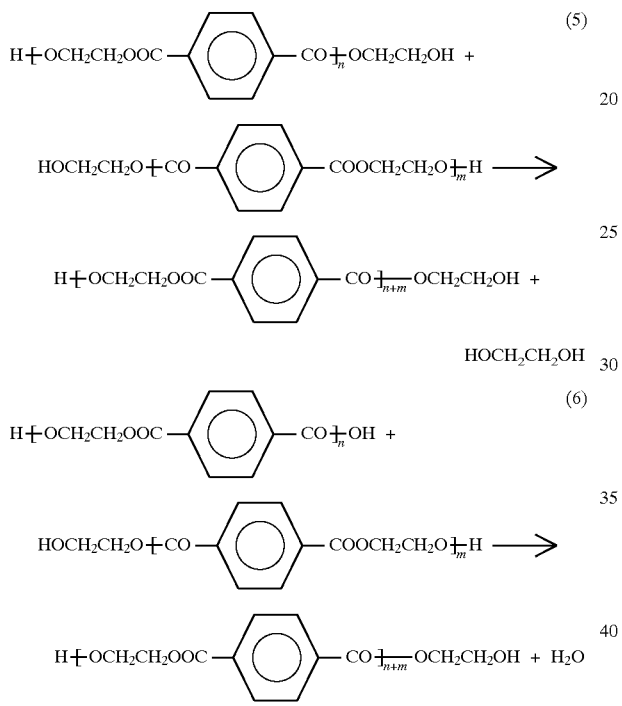

In the above reactions, some diethylene glycol (DEG) may be formed by condensation of ethylene glycol with each other, as shown in the reaction formula (7) given below. The resulting DEG will react with MHT to form a DEG ester, as shown by the reaction formula (8) as follows:

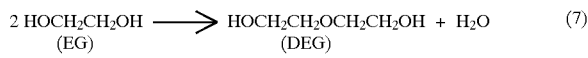

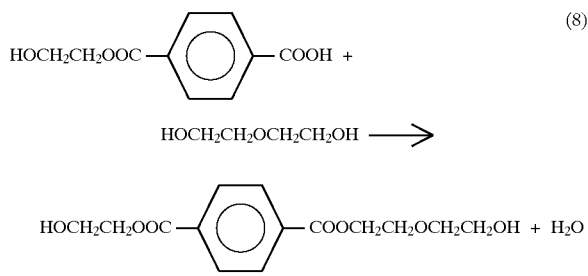

The PET produced by polycondensation in the polycondensation step 2 is then processed in the product finish-up step by granulation, crystallization and so on to obtain final product.

The reaction mother liquor separated from the polycondensation step 2 and EG separated from the esterification step are freed from useless substances in a purification step 3 before being recycled back to the esterification step 1 as the recycling liquor. Here, in the course of returning the recycling liquor to the esterification step 1, the concentrations of EG, DEG and water and so on are analyzed in line using the near infrared spectrophotometer 4 and the concentration of the catalyst is determined by the X-ray fluorescence analyzer 5 by bypassing a part of the recycling liquor as an analysis sample flow.

The concentrations of EG, DEG and water in the recycling liquor are analyzed by the near infrared spectrophotometer 4 in line without incorporating any pretreatment of the recycling liquor sample. For example, determination of the concentration of EG using the spectrophotometer 4 by near infrared ray can be effected at a wavelength of 1710 nm, that of DEG at 1728 nm and 1914 nm and that of water at 1922 nm. The resulting analysis data are supplied to a control device 6, in which the concentration of each component is calculated. Calculation for the concentration of each component is obtained by the following calculation equation or the approximate calculation equation given below:

EG conc.=14.8380+70.7468×Absorbance (at 1710 nm) (I)

DEG conc.=7.1835−379.4968×Absorbance (at 1728 nm)−16.3079×Absorbance (at 1914 nm) (II)

Water conc.=0.1351−14.9260×Absorbance (at 1922 nm) (III)

The X-ray fluorescence analyzer 5 serves for in-line analysis of elements, such as Ge, Fe, P etc., contained in the recycling liquor in an analysis sample flow line branched from the recycling line in parallel or in series with the analysis sample flow for the near infrared spectrophotometer 4, also without incorporation of any pretreatment. For example, analysis of germanium is carried out using an X-ray of 9.876 KeV. For Fe and P, X-rays of 6.400 KeV and 2.013 KeV, respectively, are used. The analysis data are put directly into the control device 6.

The control device 6 operates so as to compare the received analytical data and the calculated values with each of the correponding preset values and to put out corresponding control signals for controlling the supply rate of the starting materials, recycling rate of the recycling liquor, reaction conditions and so on in such a manner that the totalized composition of the starting materials and the materials in the recycling liquor is maintained within a predetermined range.

By controlling the supply rate of the starting materials and/or the recycling rate of the recycling liquor in such a manner that the totalized composition of the starting materials newly supplied to the reaction system and the recycling liquor, the reactions in the esterification step and in the polycondensation step will proceed always under nearly the same condition, whereby the esterification and the polycondensation can be performed in a stable manner so that a polyester product of uniform quality can be obtained.

EXAMPLES

Below, the present invention will further be described by way of Example and Comparative Examples, in which the figures for % and ppm given are on the weight basis.

Example 1

A recycling liquor containing 98% of EG, 1.5% of DEG, 0.3% of water, 2,000 ppm of Ge, 0.5 ppm of Fe and 70 ppm of P was passed to a near infrared spectrophotometer (OL-6500, a model supplied from NIRS Systems Co., with a noise level of $20\times10^{-6}$ Abs) specified in Table 1 below at a flow rate of 500 ml/min, in order to determine the absorbances at wave lengths of 1710 nm, 1728 nm, 1914 nm and 1922 nm, before it was passed then to an X-ray fluorescence analyzer (Model On-Stream 600 of Mitsuisekka & Technos K.K.) to observe fluorescent X-rays by irradiating with X-rays of energy levels of 9,876 KeV, 6,400 KeV and 2,013 KeV, respectively.

The determinations and the observations were finished within a period of 2 minutes. The resulting analysis data were processed in the control device by the calculation equations (I) to (III) given above. By repeating this operation 30 times, repeatability of wave length was confirmed, which is recited in Table 2. The analysis arrangement of Example 1 exhibited better values of correlation coefficient and standard error both for the concentrations of water and the DEG. It permitted continued operation for more than 6 months stably without necessitating any correction and maintenance work, such as washing.

Comparative Example 1

When the EG and DEG in the recycling liquor were analyzed by a gas chromatography (DB-WAX, with a carrier gas of He at 5 ml/min., at 150° C.), 20 minutes were required for the determination and a deterioration of the column was recognized after 10 determinations of samples, whereby a maintenance work for the column renewal was required at a rate of about one time and a little rest per 8 hours. For extending the operation time, a pretreatment is necessary. When the water content was determined by Karl-Fischer's titration method, 5 minutes were required for the titration. When the elements Ge, Fe and P were analyzed by atomic absorption spectroscopy (ICP plasma gas: 1.2 liters, 1.2 KW high frequency), 30 minutes were required for the determination and it was found that there was a time lag for responding to variation of concentration, whereby fluctuation of the product quality was unavoidable with lower economical profit.

Comparative Example 2

The NIRS spectrophotometer of Example 1 was replaced by another one as given in. Table 1 and the repeatability was examined. The analysis arrangement of Comparative Example 2 exhibiting inferior values of noise level and wave length repeatability gave inferior values of correlation coefficient and standard error both for the concentration of water and DEG as compared with the analysis arrangement of Example 1. The results were as given in Table 2. As seen, there was no influence on the analysis of water content by the difference in the performance of spectrophotometer but a lower correlation coefficient was found for the analysis of DEG, so that this spectrophotometer was not suitable to use.

TABLE 1

Performance of Analyzing Apparatus for Example 1 and Comparative Example 2

| | Example 1 | Compar. Example 2 |
|---|---|---|
| Noise Level (Abs) | $\leq 20 \times 10^{-6}$ | $\leq 300 \times 10^{-6}$ |
| Wave Length Repeatability | $\leq 0.01$ nm | $\leq 0.05$ nm |

TABLE 2

Repeatability in Example 1 and Comparative Example 2

| | | Water content (Lab. value = 0.3%)*) | | DEG conc. (Lab. value = 1.5%)*) | |
|---|---|---|---|---|---|
| | | Example 1 | Compar. Example 2 | Example 1 | Compar. Example 2 |
| Number of determination | (n) | 30 | 30 | 30 | 30 |
| Correlation coefficient | (R) | 0.998 | 0.992 | 0.989 | 0.901 |
| Standard error | (SEP) | 0.018 | 0.028 | 0.036 | 0.104 |

*):Laboratory value, which is obtained by the determination by the method of Comparative Example 1.

We claim:

1. A process for producing a polyester by preparing a slurry of powdery aromatic dicarboxylic acid in a liquid diol and processing the resulting slurry through an esterification step and a polycondensation step in the presence of a catalyst, comprising recycling a liquid containing the unreacted diol and the catalyst separated from the reaction mixture in the polycondensation step back to the esterification step as recycling liquor, detecting the concentrations of diol, diol condensation products, catalyst and water in the recycling liquor in the course of being recycled back to the esterification step by a near infrared spectrophotometer of a noise level of at the highest $50\times10^{-6}$ Abs with a wave length repeatability of 0.01 nm or less as well as by an X-ray fluorescence analyzer and controlling the operation of the reactor based on the detected analytical values in such a manner that the totalized composition of the starting materials supplied to the reaction system and the recycling liquor will be maintained in a predetermined range.

2. A process as claimed in claim 1, wherein the esterification step comprises plural stages, said process further comprising a separation step which comprises separating most of the unreacted diol from the esterification step and returning the separated unreacted diol to the first stage of the esterification step as recycling liquor.

3. A process as claimed in claim 1 or 2, wherein the recycling liquor is purified in a purification step before being recycled back to the esterification step.

4. A process as claimed in either one of claims 1 to 3, wherein the aromatic dicarboxylic acid comprises terephthalic acid as the main component and the diol comprises ethylene glycol as the main component.

5. A process as claimed in claim 1 wherein the step of controlling comprises adjusting the feed rates of the reactants to the esterification step.

6. A process as claimed in claim 1 wherein the step of controlling comprises adjusting the recycling rate of the recycling liquor.

* * * * *